APPARATUS FOR ATTACHING LEADS TO ELECTRICAL COMPONENTS

Filed April 29, 1964 4 Sheets-Sheet 1

INVENTORS
T. C. FITZGERALD
G. P. McGRAW, JR.
BY A. C. Schwarz, Jr.
ATTORNEY

APPARATUS FOR ATTACHING LEADS TO ELECTRICAL COMPONENTS

Filed April 29, 1964 4 Sheets-Sheet 4

3,348,016
Patented Oct. 17, 1967

3,348,016

APPARATUS FOR ATTACHING LEADS TO ELECTRICAL COMPONENTS

Thomas C. Fitzgerald, Chicago, and George P. McGraw, Jr., Downers Grove, Ill., assignors to Western Electric Company, Incorporated, New York, N.Y., a corporation of New York Filed Apr. 29, 1964, Ser. No. 363,426
5 Claims. (Cl. 219—107)

The present invention relates to apparatus for attaching leads to electrical components, and more particularly to mechanism for heating and pressing a pair of headed leads against the fusible end portions of capacitors to effect the bonding of the leads thereto.

An object of the invention is to provide an improved apparatus for attaching leads to electrical components.

Another object of the invention is to provide an efficient and effective apparatus for bonding headed leads to fusible end portions of electrical components.

An apparatus illustrating certain features of the invention may include holders for supporting a capacitor and a pair of headed leads in coaxial alignment with and at opposite ends of the capacitor, two pairs of electrodes, and mechanism including a single air-operated actuator for effecting sequentially the movement of the electrodes from a normal retracted position to an operative position with the electrodes of each pair disposed in straddling relation to one of the leads, the pivotal movement of the electrodes of each pair to closed position in close proximity to the leads, the movement of the pair of electrodes toward each other to engage the heads of the leads and press them against the ends of the capacitor, the electrical heating of the leads for a short interval, the holding of the electrodes against the lead heads during the cooling of the leads, and the removal of the electrodes from the leads.

Other objects, advantages and novel aspects of the invention will become apparent upon consideration of the following detailed description, in conjunction with the accompanying drawings, in which.

Figure 5:
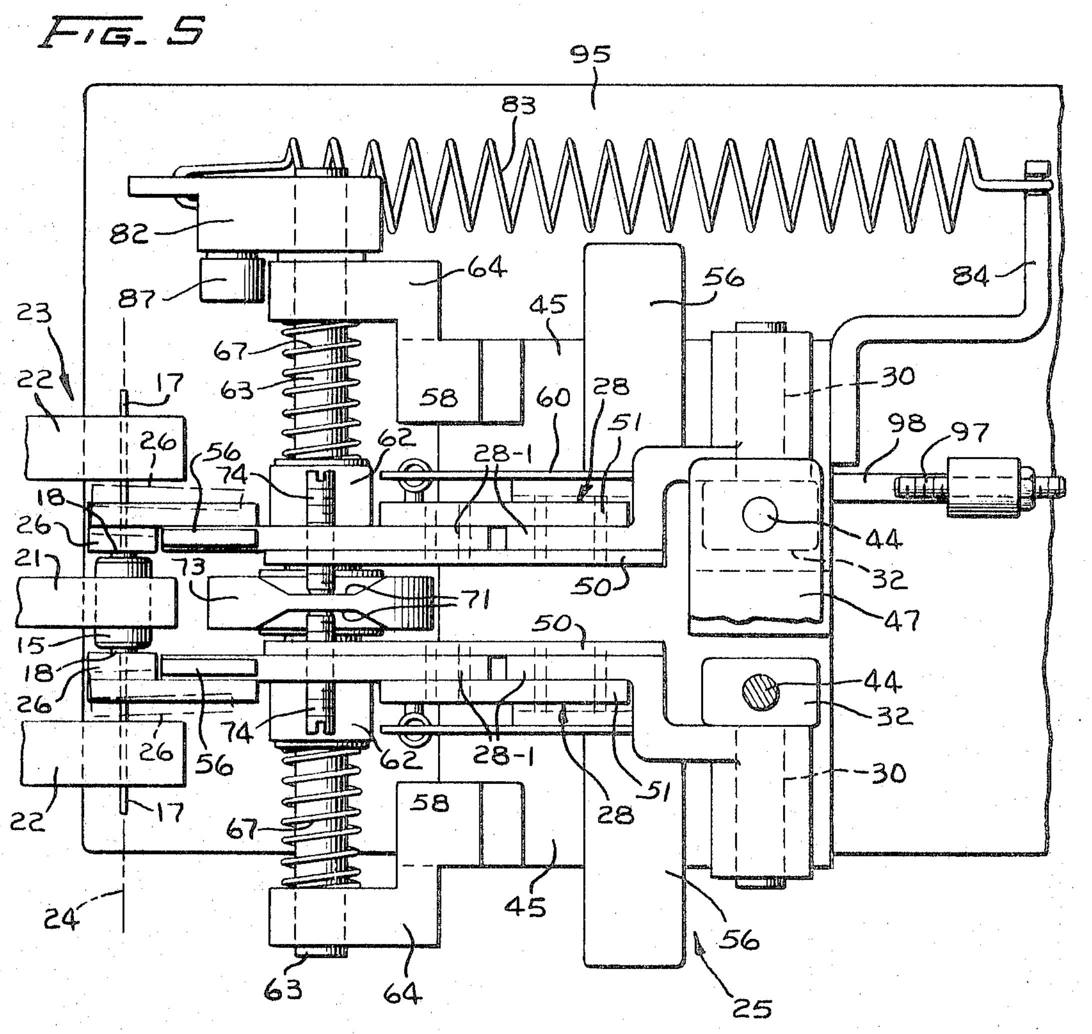
FIG. 5 is a fragmentary plan view of the apparatus.
Figure 6:
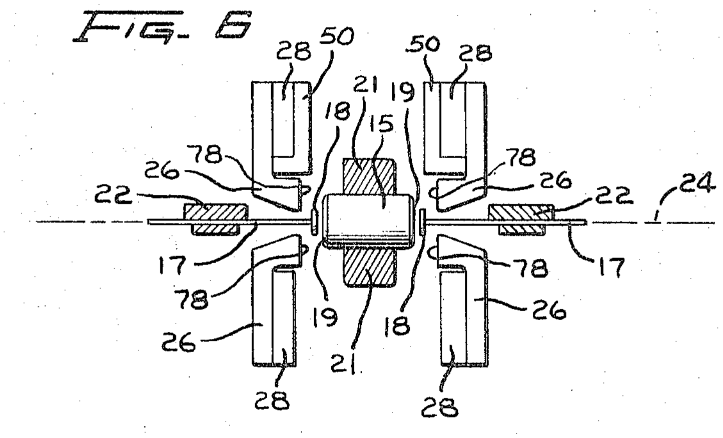
FIG. 6 is a fragmentary elevational view of a portion of the apparatus showing the holders for the capacitor and the leads in section and showing the ends of the electrodes in the open position relative to the leads and indicated as taken along the line 6—6 of FIG. 2.

The present apparatus is designed to support a capacitor 15 and a pair of headed leads 17 (FIG. 6) in coaxial alignment with one another and with the heads 18 of the leads disposed adjacent opposite ends of the capacitor and to press the lead heads 18 into engagement with fusible terminal or end portions 19 of the capacitor (FIG. 5) and to electrically heat the heads 18 to effect the bonding of the leads to the capacitor. A holder 21 and a pair of holders 22 of a multi-station turret rotatable about a horizontal axis support the capacitor 15 and the leads 17, respectively, at a soldering station 23 in predetermined position coincident with a horizontal axis 24 (FIGS. 5 and 6). The leads 17 are yieldably supported in the holders 22 for axial movement into engagement with the capacitor 15.

Figure 1:
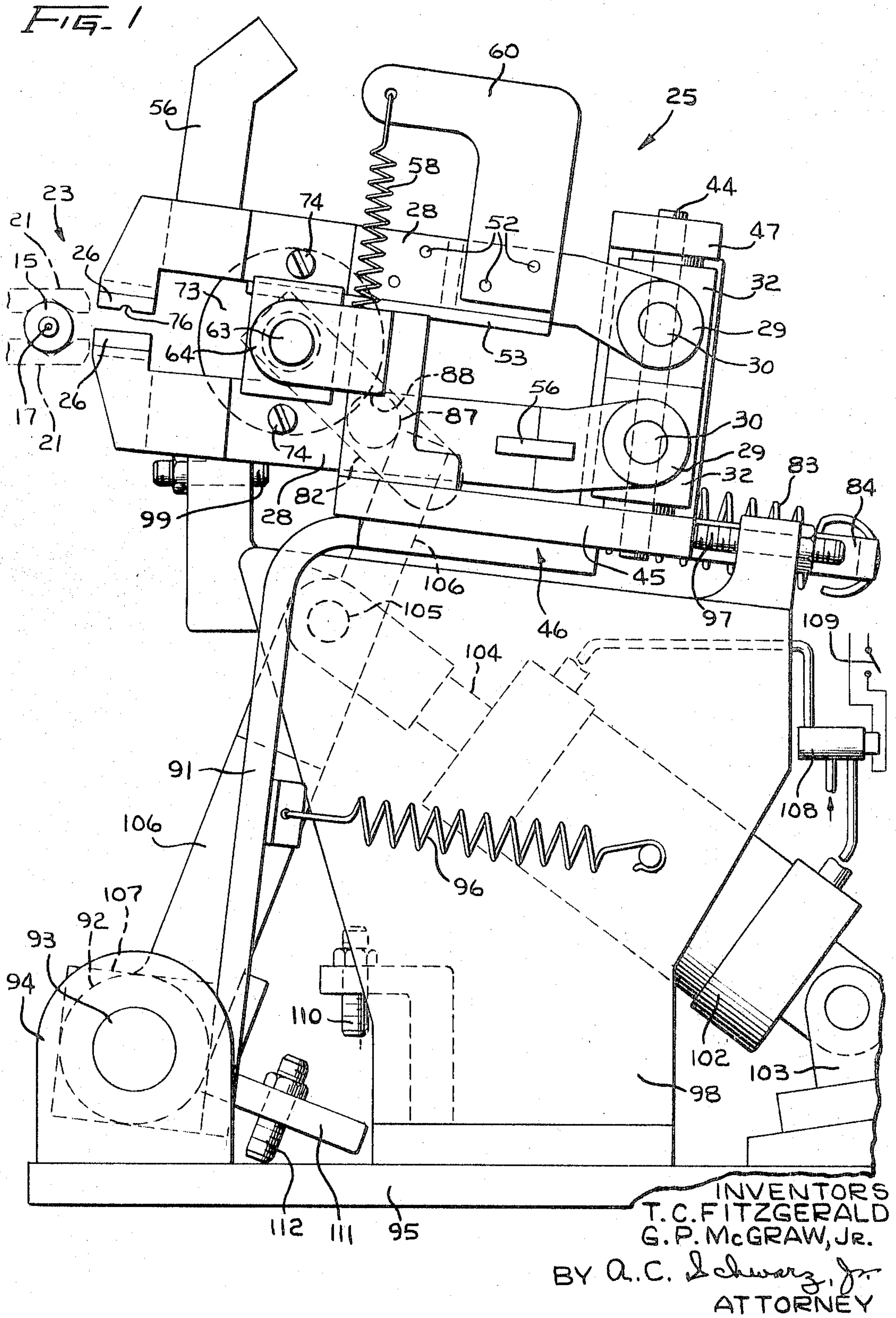
FIG. 1 is a fragmentary side elevational view of the apparatus with the device for heating and pressing the leads against the capacitor disposed in a retracted position and with the electrodes in open position and spaced from the leads.
Figure 2:
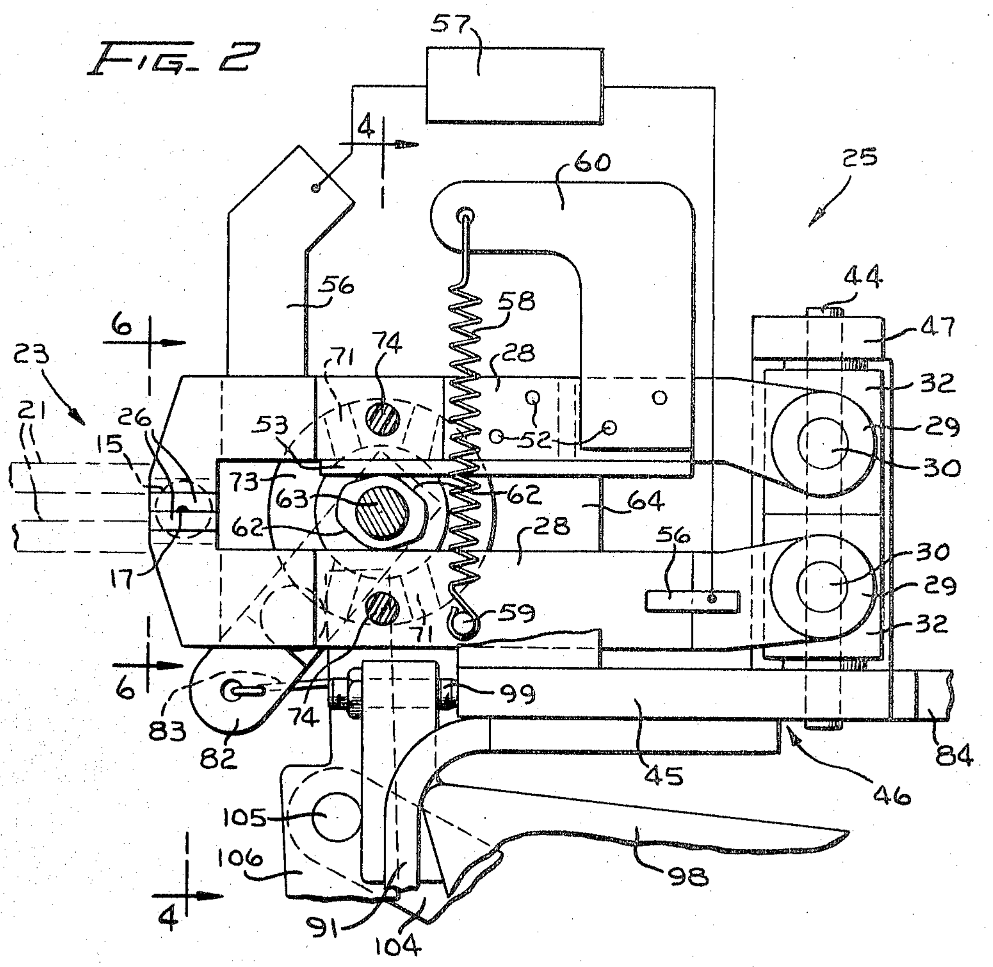
FIG. 2 is a fragmentary side elevational sectional view of the apparatus showing the lead heating and actuating device in its forward position with the electrodes in straddling relation to the leads and inclosed position in close proximity to the leads.

A device 25 is provided for effecting the soldering of the lead heads 18 to the capacitor 15 and includes two pair of electrodes 26. The electrodes of each pair are mounted on the forward end on a pair of arms 28 which have apertured bosses 29 at the other ends thereof that are mounted on trunnions 30 for supporting the electrodes 26 and the arms 28 for pivotal movement about horizontal axes to and from open and closed position (FIGS. 1 and 2). The trunnions 30 extend laterally from apertured members 32 which are supported on vertical pintles 44 for pivotal movement of the electrodes 26 about vertical axis toward and away from each other substantially parallel to the axis 24. The pintles 44 are secured at their lower ends to a frame plate 45 of a carrier 46 and at their upper end to a T-shaped bracket 47 on the frame plate 45.

Figure 4:
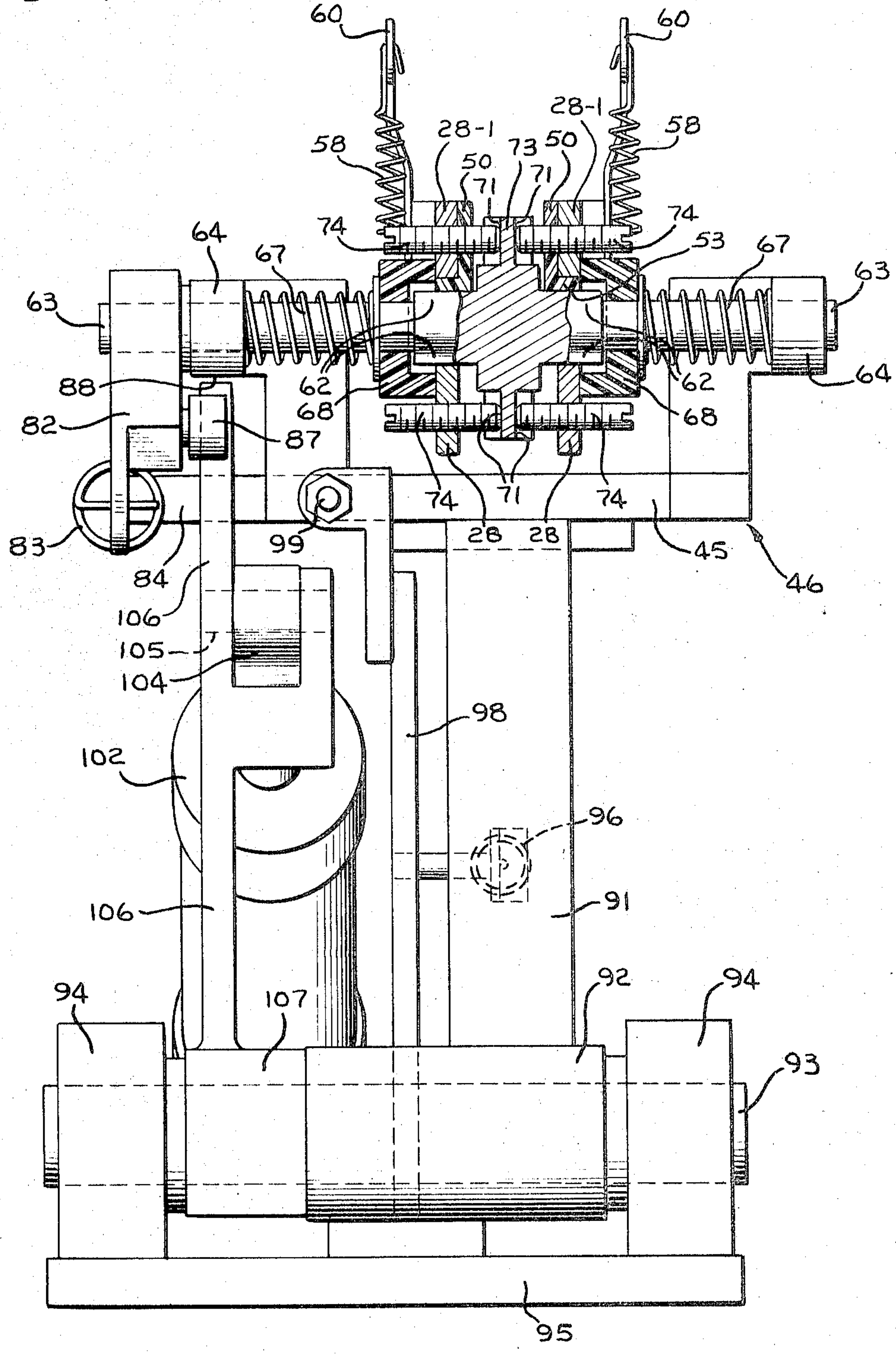
FIG. 4 is a vertical elevational view of the device indicated as taken on the line 4—4 of FIG. 2.

To electrically insulate the electrodes of each pair from one another, the arm 28 of each of the upper electrodes is made in two sections 28–1 (FIG. 5) which are supported in spaced and insulated relation to each other by members 50 and 51 of dielectric material and held together by rivets 52. A portion 53 of the dielectric member 50 extends beneath the arm sections 28–1 as illustrated in FIG. 4.

As shown in FIG. 2, the electrodes 26 through terminals 56 thereon are connected electrically to a source of current and to a control device therefor indicated diagrammatically at 57 for effecting the heating of the electrodes 26 and the lead heads 18 for predetermined intervals.

Figure 3:
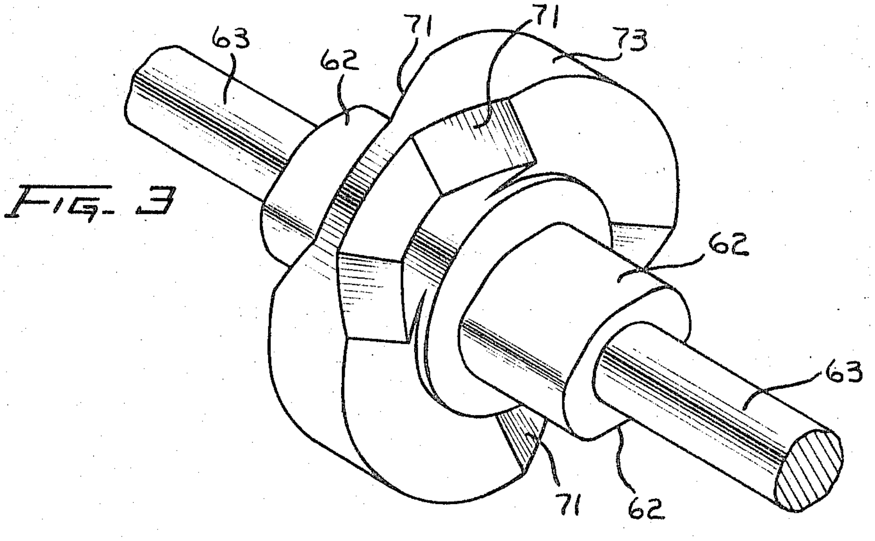
FIG. 3 is an enlarged fragmentary perspective view of an oscillatory actuating element of the device.

Movement of the electrodes 26 to a closed position (FIG. 2) is effected by springs 58 which are connected to a pin 59 on the lower arm 28 and to a bracket 60 on the upper arm. Cooperating with the springs 58 are cams 62 on a cam shaft 63 (FIGS. 3 and 4) to effect the movement of the electrodes 26 to and from open and closed positions. The cam shaft 63 is journalled in bearing brackets 64 mounted on the carrier plate 45.

Helical compression springs 67 encircling the shaft 63 urge the electrode supporting arms 28 for pivotal movement about the pintles 44 toward each other to press the lead heads 18 against the fusible terminals 19 on the ends of the capacitor 15. Hollow members 68 of dielectric material are slidable on the shaft 63 and interposed between the ends of the springs 67 and the pairs of the electrode supporting arms 28 (FIGS. 4 and 5) to transmit the pressure of the springs 67 to the arms 28 and provide clearance for the cams 62. Cooperating with the springs 67 to effect the reciprocable movement of the pairs of electrodes 26 toward and away from each other axially of the leads 17 are cams 71 (FIGS. 3 and 4) which are formed on opposite faces of an enlarged disc-like portion 73 of the cam shaft 63. Cam followers 74 of dielectric material, mounted on the electrode supporting arms 28, engage the cams 71.

As viewed from the side in FIG. 2, the electrodes 26 are spaced apart from each other vertically in closed position and each upper electrode is provided with a groove 76 (FIG. 1) on the lower surface thereof so that neither or only one of each pair of the electrodes engages the shank of a lead 17. The electrodes 26 are also provided with vertically disposed surfaces 78 (FIG. 6) for engaging lateral surfaces of the lead head 18 above and below the lead shank 17 to provide good electrical contact therewith during the heating and soldering of the lead head to the capacitor 15. It will be noted that the electrode supporting arms 28 are movable relative to each other about the vertical pintles 44 so that both of the electrodes will engage the lead head 18 in the event that the head 18 is inadvertently bent obliquely to the lead shank 17.

A rocker arm 82 is secured to one end of the shaft 63 and is urged by a spring 83 for movement in a counter-clockwise direction from a normal retracted position (FIG. 1) to an advanced position (FIG. 2). The spring 83 is connected at one end to the rocker arm 82 and is connected at its other end to a bracket 84 secured to the carrier plate 45. A roller 87 on the rocker arm 82 engages a stop surface 88 (FIGS. 1 and 4) on one of the cam shaft supporting brackets 64 to stop the rocker arm 82 in its retracted position (FIG. 1).

The carrier 46 is mounted on the upper end of an arm 91, the lower enlarged and apertured end 92 of which is oscillatably supported on a horizontal pivot rod 93 and serves to support the carrier 46 for movement to and from a normal retracted position (FIG. 1) with the electrodes 26 spaced from the leads 17, and a forward position (FIG. 2) with the electrodes 26 in straddling relation to the leads 17. The pivot rod 93 is mounted in a pair of blocks 94 secured to a horizontal stationary frame plate 95. A spring 96 urges the carrier 46 to the normal retracted position (FIG. 1) in which it is supported by a stop 97 that engages the carrier plate 45 and is mounted on a vertically disposed bracket 98. The bracket 98 is secured to the horizontal frame plate 95 and has a second stop 99 thereon for stopping the carrier 46 in its forward position (FIG. 2).

Movement of the carrier 46 to its forward position is effected by a fluid-operated actuator 102 (FIG. 1) which is pivotally supported at one end on a bracket 103 secured to the frame plate 95. A reciprocatory piston rod 104 of the actuator is connected at 105 to a lever 106, the lower apertured end 107 of which is pivotally supported on the rod 93 (FIG. 4). The upper end of the lever 106 is engageable with the roller 87 on the rocker arm 82 and cooperates with the spring 83 to impart movement to the rocker arm in response to the reciprocation to the piston rod 104. The arrangement is such that in response to admission of compressed air to one end of the actuator 102 under control of a selectively operable solenoid actuated valve 108 and a switch 109, the piston rod 104 is advanced and imparts rotation to the lever 106 in a counterclockwise direction from the position shown in FIG. 1.

During the first portion of this counterclockwise movement of the lever 106 pressure is applied to the roller 87 on the rocker arm 82 and effects the movement of the carrier 46 through the spring 83 from the retracted position (FIG. 1) to the forward position (FIG. 2) to bring the pairs of electrodes 26 into straddling relation with the leads 17 adjacent to the lead heads 18 as illustrated in FIG. 6 and in dotted lines in FIG. 5, in which position the carrier 46 is stopped by the stop member 99. Continued movement of the lever 106 rotates the rocker arm 82 in a clockwise direction from the retracted position (FIG. 1) to the forward position (FIG. 2) to cause the cam shaft 63 to rotate and the cams 62 and 71 in cooperation with the springs 58 and 67 to effect the movement of the electrodes to the closed position and the movement of the pairs of electrodes 26 toward each other axially of the leads 17 to engage the heads 18 of the leads and press them against the end of the capacitor 15. Counterclockwise movement of the lever 106 is arrested by a stop 110 on the frame plate 95 which engages an arm 111 on the lever 106.

The control device 57 is actuated in timed relation to the indexing of the turret by mechanism (not shown) to effect the electrical heating of the electrodes and of the lead heads 18 for a predetermined length of time to cause the heads 18 to melt the terminal ends 19 of the capacitor and become bonded thereto. The electrodes 26 remain in engagement with the leads for a short period of time while the heads 18 cool, after which the switch 109 is actuated by mechanism (not shown) on the turret to cause the reversal of the valve 108 and the actuator 102 and the reverse movement of the piston rod 104 and of the actuating lever 106.

During the first portion of the reverse movement of the actuating lever 106, the rocker arm 82 is rotated under the influence of the spring 83 from its advanced position to its retracted position to effect the movement of the pairs of electrodes 26 axially of the leads 17 away from each other and from the lead heads 18 and to effect the movement of the electrodes 26 of each pair from closed position to open position. During this movement of the rocker arm 82 to its retracted position, the carrier 46 is maintained in its forward position by the spring 83. In response to continued return movement of the lever 106 and as it leaves the roller 87 on the rocker arm 82, the carrier 46 is moved by the spring 96 from its forward position to its retracted position in engagement with the stop 97. Movement of the lever 106 in the clockwise direction is arrested by the engagement of a stop member 112 on the arm 111 of the lever 106 (FIG. 1) with the frame plate 95.

It is to be understood that the above-described arrangements are simply illustrative of the application of the principles of this invention. Numerous other arrangements may be readily devised by those skilled in the art which will embody the principles of the invention and fall wtihin the spirit and scope thereof.

What is claimed is:

1. In an apparatus for attaching leads to electrical components, the combination of:

holding means for supporting a component and a headed lead with the head of the lead adjacent one end of the component;

a pair of electrodes engageable with one side of the head of the lead;

means for supporting said electrodes for movement relative to one another from an open position to a closed position about the lead and for movement of said pair of electrodes in a direction axially of the lead;

means for effecting relative movement between said holding means and said supporting means to position the electrodes in straddling relation to the lead and adjacent to the head thereof;

means on said supporting means including an oscillatory member having first cams for effecting the movement of said electrodes from the open position to the closed position and having second cams for effecting the movement of said pair of electrodes axially of the lead to engage the head of the lead and press it against the end of the component in response to movement of said oscillatory member from a first position to a second position;

means for actuating said oscillatory member to and from said first and said second position; and means for electrically heating said electrodes.

2. In an apparatus for attaching leads to electrical components, the combination of:

a holder for supporting a component and a headed lead with the head of the lead adjacent one end of the component;

a pair of electrodes engageable with one side of the head of the lead;

a carrier movable toward and away from said holder for supporting said electrodes for movement therewith toward and away from the lead and for movement of said electrodes relative to each other from an open position to a closed position about the lead and for movement axially of the lead;

means on said carrier including an oscillatory member having first cams for effecting the movement of said electrodes from the open position to the closed position and having second cams for effecting the movement of said pair of electrodes axially of the lead to engage the head of the lead and press it against the end of the component in response to movement of said oscillatory member from a first position to a second position;

actuating means for effecting the sequential movement of said carrier toward and away from said holder and the movement of said oscillatory member to and from said first and second positions; and means for electrically heating said electrodes.

3. In an apparatus for attaching headed leads to electrical components, the combination of:

holding means for supporting a component and a pair of headed leads and with the heads of the leads positioned adjacent the ends of the component;

two pairs of electrodes, each pair of which is engageable with one side of the head of a lead;

means for supporting said two pairs of electrodes for movement of the electrodes of each pair relative to one another from an open position to a closed position about the lead and for movement of the pairs of electrodes toward and away from each other axially of the leads;

means for effecting relative movement between said holding means and said electrode supporting means to position said electrodes in straddling relation to the leads and adjacent to the heads thereof;

means on said electrode supporting means including an oscillatory member having first cams for effecting the movement of said electrodes from the open to the closed position and having second cams for effecting the movement of said pairs of electrodes axially of the leads to engage the heads of the leads and press them against the ends of the component in response to movement of said oscillatory member from a first position to a second position;

means for actuating said oscillatory member to and from said first and said second positions; and means for connecting said pairs of electrodes to a source of electrical potential to effect the heating of the lead heads.

4. An apparatus for attaching leads to electrical components which comprises:

means for supporting a component and a pair of headed leads and with the heads of the leads adjacent to and at opposite ends of the component;

a first pair of electrodes movable from an open position to a closed position about one lead;

a second pair of electrodes movable from an open position to a closed position about the other lead;

a carrier for supporting said first pair and said second pair of electrodes for pivotal movement of said electrodes of each pair to open and closed positions and for pivotal movement of said pairs of electrodes toward and away from each other axially of the leads;

means for supporting said carrier for movement from a retracted position with the electrodes spaced from the leads to a forward position with said electrodes straddling the leads and adjacent the heads thereof;

resilient means for urging said pairs of electrodes for movement toward each other to effect the movement thereof from a normal position into engagement with the heads on the leads and the movement of the heads into engagement with the component;

a member mounted on said carrier for oscillatory movement and having first cams for effecting the pivotal movement of said electrodes to and from closed and open positions and having second cams for effecting the pivotal movement of said pairs of electrodes axially of the leads to and from the normal position;

resilient means on said carrier for urging said oscillatory member in one direction from a first position to a second position to effect the movement of said electrodes to their open position and the movement of said pairs of said electrodes to their normal position;

means for sequentially actuating said carrier to and from said forward and retracted positions and said oscillatory member to and from said first and second positions to effect the movement of said electrodes into straddling relation with the leads and into closed position about the leads and the movement of said pairs of electrodes toward each other to press the lead heads into engagement with the ends of the component; and means for electrically heating said electrodes.

5. An apparatus for attaching leads to electrical components which comprises:

means for supporting a component and a pair of headed leads and with the heads of the leads adjacent to and at opposite ends of the component;

a first pair of electrodes movable from an open position to a closed position about one lead;

a second pair of electrodes movable from an open position to a closed position about the other lead;

a carrier for supporting said first pair and said second pair of electrodes for movement of said electrodes of each pair to open and closed positions and for movement of said pairs of electrodes toward and away from each other axially of the leads;

mounting means for supporting said carrier for movement from a retracted position with the electrodes spaced from the leads to a forward position with said electrodes straddling the leads adjacent the heads thereof;

yieldable means for moving said carrier to the retracted position;

resilient means for urging said pairs of electrodes toward each other to effect the movement thereof axially of said leads from a normal position into engagement with the heads on the leads and the movement of the heads into engagement with the component;

means including a shaft mounted on said carrier for oscillatory movement and having first cams for effecting the movement of said electrodes to and from closed and open positions and having second cams for effecting the movement of said pairs of electrodes away from each other to a normal position;

a rocker arm on said shaft;

resilient means on said carrier for urging said rocker arm and said shaft in one direction from a first position to a second position to effect the movement of said electrodes to the open position and the movement of the pairs of said electrodes to the normal position;

a lever pivotally supported on said mounting means for actuating said rocker arm in the opposite direction and for imparting movement to said carrier;

means on said mounting means for actuating said lever through a predetermined stroke to effect the sequential movement of said carrier from the retracted position to the forward position and the movement of said rocker arm from the second position to the first position; and means for electrically heating said electrodes.

References Cited

UNITED STATES PATENTS

| | | | |
|---|---|---|---|
| 3,089,220 | 5/1963 | Nyborg | 228—5 |
| 3,200,471 | 8/1965 | Johnson et al. | 219—79 |
| 3,274,667 | 9/1966 | Siebertz | 219—107 |
| 3,294,950 | 12/1966 | Hagner et al. | 210—103 |

RICHARD M. WOOD, *Primary Examiner.*

W. D. BROOKS, *Assistant Examiner.*